(12) United States Patent
Lasch et al.

(10) Patent No.: US 6,291,586 B2
(45) Date of Patent: *Sep. 18, 2001

(54) AMIDE FUNCTIONAL ULTRAVIOLET LIGHT ABSORBERS FOR POLYURETHANES AND POLYUREAS

(75) Inventors: James E. Lasch, Oakdale; David B. Olson, May Township; David M. Burns, Woodbury, all of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,589

(22) Filed: Oct. 31, 1997

Related U.S. Application Data

(63) Continuation-in-part of application No. 08/642,551, filed on May 3, 1996, now Pat. No. 5,994,431.

(51) Int. Cl.[7] .................................................... C08F 8/00
(52) U.S. Cl. ...................... 525/123; 427/160; 427/162; 427/163.4; 430/495.1; 430/931; 524/89; 524/91; 524/94; 525/128; 525/281; 525/343; 525/348; 525/375; 525/419; 525/420; 525/424; 525/426; 525/434; 525/440; 525/452
(58) Field of Search ................................ 525/281, 329.9, 525/343, 420, 348, 426, 375, 437, 123, 128, 419, 424, 440, 452; 430/495.1, 517, 519, 931; 524/89, 91, 94; 427/160, 162, 163.4

(56) References Cited

U.S. PATENT DOCUMENTS

| | | |
|---|---|---|
| 3,267,113 | 8/1966 | Carboni .................................. 524/91 |
| 3,337,356 | 8/1967 | Carboni .................................. 524/91 |
| 4,853,471 | 8/1989 | Rody et al. ............................ 548/261 |
| 4,973,702 | 11/1990 | Rody et al. ............................ 548/261 |
| 5,032,498 | 7/1991 | Rody et al. ............................ 430/512 |
| 5,627,227 | 5/1997 | Suga et al. ............................. 524/91 |
| 5,691,846 | * 11/1997 | Benson, Jr. et al. .................. 359/530 |

FOREIGN PATENT DOCUMENTS

| | | |
|---|---|---|
| 057 160 A | 8/1982 | (EP) . |
| 342 974 A | 11/1989 | (EP) . |
| 593 936 A | 4/1994 | (EP) . |
| 657 577 A | 6/1995 | (EP) . |
| WO 97 42261 A | 11/1997 | (WO) . |
| WO 98 03489 A | 1/1998 | (WO) . |

OTHER PUBLICATIONS

Chemical Abstracts—vol. 115, No. 9 of Sep. 2, 1991—Columbus Ohio, US; Abstract No. 92277, Golubski, Z.: Preparation of—XP0020707742, See abstract & PL 152 683B.

* cited by examiner

*Primary Examiner*—Judy M. Reddick
(74) *Attorney, Agent, or Firm*—Carolyn A. Fischer

(57) ABSTRACT

An ultraviolet light absorbing material that resists blooming and migration is made up of a polyurethane or polyurea polymer and an amide functional ultraviolet light absorbing compound, wherein the polymer and the amide functional ultraviolet light absorbing compound are hydrogen bonded to one another. Polymeric films that contain a polymeric matrix and the ultraviolet light absorbing material are useful as the top layer in multilayer constructions such as retroreflective sheetings and conformable marking sheets.

21 Claims, No Drawings

AMIDE FUNCTIONAL ULTRAVIOLET LIGHT ABSORBERS FOR POLYURETHANES AND POLYUREAS

CROSS-REFERENCE TO RELATED APPLICATION

This application is a continuation-in-part to U.S. Application Ser. No. 08/642,551, filed May 3, 1996, now U.S. Pat. No. 5,994,431 which is incorporated herein in its entirety by reference.

FIELD OF THE INVENTION

This invention relates to ultraviolet light absorbing materials that comprise a polyurethane polymer or polyurea polymer and an amide functional ultraviolet light absorbing compound. The invention also relates to films that incorporate such ultraviolet light absorbing materials and to articles that include such films.

BACKGROUND OF THE INVENTION

The effect of ultraviolet light on articles such as retroreflective sheetings for use on license plates or signage articles that are exposed to the sun or other sources of ultraviolet light are of great concern to the manufacturers of such articles. Over time, constant or repeated exposure to ultraviolet light can result in fading of the dyes and pigments used in such articles and in the degradation or breakdown of the adhesives, polymers, and other materials used in the construction of the articles. This fading and degradation shortens the useful life of the articles in question, making protection from ultraviolet light exposure an issue of great importance to the manufacturers of such articles.

Molecules that function as ultraviolet light absorbers are generally known in the art. For example, in U.S. Pat. No. 4,853,471 Rody et al. describe 2-(2-hydroxyphenyl)-benzotriazole compounds that are useful as ultraviolet light absorbers. These compounds are described as useful in the stabilization of a wide variety of polymeric materials against ultraviolet light, particularly those that are used in the preparation of photographic materials. Other classes of ultraviolet light absorbers include the 2-hydroxybenzophenones and the diphenylcyanoacrylates.

While such compounds are known to absorb ultraviolet light, their incompatibility with the polyurethanes often used as the top film in multilayer sheetings has limited their long term usefulness in such constructions. The low solubility and/or high mobility of typical ultraviolet light absorbers in polyurethanes results in an inability to maintain high levels of these compounds in polyurethane films; the compounds tend to bloom or migrate out of the film, and the protective properties of the compounds are lost.

Therefore, a need exists for ultraviolet light absorbing materials that are compatible with and resist blooming out of polyurethanes, and for products such as polyurethane films and other articles that incorporate such a material.

SUMMARY OF THE INVENTION

The invention provides an ultraviolet light absorbing material made up of a polyurethane or polyurea polymer and an amide functional ultraviolet light absorbing compound, wherein the ultraviolet light absorbing compound is hydrogen bonded to the polyurethane or polyurea polymer and there is at least one hydrogen bonding site on the polymer per mole of ultraviolet light absorbing compound. For the sake of clarity, the invention will be described with reference to polyurethane polymers (i.e., products of the reaction of diisocyanates with diols) however it will be understood that the invention includes polyurea polymers (i.e., products of the reaction of diisocyanates with diamines).

The invention also provides a polymeric film made up of a polymeric matrix and an ultraviolet light absorbing material, said ultraviolet light absorbing material made up of a polyurethane polymer and an amide functional ultraviolet light absorbing compound, wherein the amide functional ultraviolet light absorbing compound is hydrogen bonded to the polyurethane polymer and there is at least one hydrogen bonding site on the polymer per mole of ultraviolet light absorbing compound. By "polymeric matrix" is meant a matrix comprising one or more homopolymers, copolymers, polymer blends, or polymer alloys. The ultraviolet light absorbing material is compatible with the polymeric matrix, i.e., it is miscible therein or can be blended therein.

The invention further provides a method of protecting a substrate from the effects of ultraviolet light, the method comprising applying a polymeric film to the substrate, said film comprising a polymeric matrix and an ultraviolet light absorbing material, said ultraviolet light absorbing material comprising a polyurethane polymer and an amide functional ultraviolet light absorbing compound, wherein the ultraviolet light absorbing compound is hydrogen bonded to the polyurethane polymer and there is at least one hydrogen bonding site on the polymer per mole of ultraviolet light absorbing compound.

In addition the invention provides products such as retroreflective sheetings, signage articles and conformable marking sheets that comprise the polymer films of the invention. In one such aspect the invention provides a conformable marking sheet comprising a top polymeric film layer having glass microspheres and skid resistant particles partially embedded therein, the film comprising a polymeric matrix and an ultraviolet light absorbing material, the ultraviolet light absorbing material comprising a polyurethane polymer and an amide functional light absorbing compound, wherein the amide functional ultraviolet light absorbing compound is hydrogen bonded to the polyurethane polymer and there is at least one hydrogen bonding site on the polymer per mole of ultraviolet light absorbing compound; an optional base layer, e.g., comprising a deformable thermoplastic polymer and a nonreinforcing mineral particulate; an optional adhesive layer, e.g., pressure sensitive adhesive; and an optional release liner.

In another aspect of the invention is provided an enclosed-lens retroreflective sheeting, e.g., comprising a layer of lenses anchored in a binder layer, a specularly reflective layer underlying the lenses, and a top layer comprising a polymeric film, said film comprising a polymeric matrix and an ultraviolet light absorbing material, said ultraviolet light absorbing material comprising a polyurethane polymer and an amide functional ultraviolet light absorbing compound, wherein the amide functional ultraviolet light absorbing compound is hydrogen-bonded to the polyurethane polymer and there is at least 1 hydrogen bonding site on the polymer per molecule of ultraviolet light absorbing compound. Embedded-lens retroreflective sheetings and encapsulated-lens retroreflective sheetings may be made in accordance with the invention. Retroreflective signs and articles including such sheetings are also provided.

In another aspect, the invention provides a cube corner type retroreflective articles comprising an overlay or cover layer with a layer of cube corner shaped elements on a side thereof wherein the overlay or cover layer comprises a film comprising a polymeric matrix and an ultraviolet light absorbing material, the ultraviolet light absorbing material comprising a polyurethane polymer and an amide functional light absorbing compound, wherein the amide functional ultraviolet light absorbing compound is hydrogen bonded to the polyurethane polymer and there is at least one hydrogen bonding site on the polymer per mole of ultraviolet light absorbing compound.

The term "polymer" is used herein to refer to compounds that have more than one occurrence of a given monomeric structural unit.

As used herein the term "amide functional ultraviolet light absorbing compound" refers to a compound that absorbs ultraviolet light and that contains at least one -CONH- moiety. The term "UVA" is used interchangeably with the term "amide functional ultraviolet light absorbing compound".

DETAILED DESCRIPTION OF ILLUSTRATIVE EMBODIMENTS OF THE INVENTION

Ultraviolet Light Absorbing Material

As described above, the ultraviolet light absorbing material of the invention is composed of an amide functional light absorbing compound and a polyurethane polymer. In these materials there is at least one hydrogen bonding site present on the polymer per mole of ultraviolet light absorbing compound and the amide functional ultraviolet light absorbing compound is hydrogen bonded to the polyurethane polymer.

In addition to absorbing ultraviolet light, the UVAs useful in the invention are preferably transparent to visible light. Useful classes of amide functional ultraviolet light absorbing compounds include amide containing 2-hydroxyphenylbenzotriazoles, 2-hydroxybenzophenones, diphenylcyanoacrylates, and triazines.

Any 2-hydroxyphenylbenzotriazole ultraviolet light absorbing compound that contains an amide group may be used in the material of the invention. Suitable 2-hydroxyphenylbenzotriazole compounds include those having formula (I):

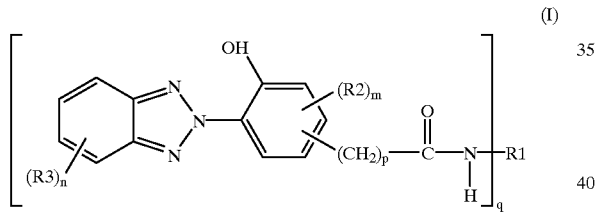

wherein R1 is straight-chain or branched $C_1$–$C_{18}$ alkyl, straight-chain or branched $C_3$–$C_{18}$ alkyl which is interrupted by O, S, or —NR4—, $C_5$–$C_{12}$ cycloalkyl, $C_6$–$C_{14}$ aryl, $C_7$–$C_{15}$ aralkyl, straight-chain or branched $C_3$–$C_8$ alkenyl, $C_1$–$C_3$ hydroxyalkyl or

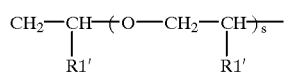

wherein R1' is H or straight-chain or branched $C_{1-6}$ alkyl; R4 is H, straight-chain or branched $C_1$–$C_{18}$alkyl, $C_6$–$C_{12}$ cycloalkyl, straight-chain or branched $C_3$–$C_8$ alkenyl, $C_6$–$C_{14}$ aryl or $C_7$–$C_{18}$ aralkyl;

each R2 is independently halogen, hydroxy, straight-chain or branched $C_{1-6}$ alkyl, straight-chain or branched $C_{1-6}$ alkoxy, straight-chain or branched $C_{1-6}$ alkanol, amino, straight-chain or branched $C_{1-6}$ alkylamino, or straight-chain or branched $C_{1-6}$ dialkylamino;

each R3 is independently halogen, hydroxy, straight-chain or branched $C_{1-6}$ alkyl, straight-chain or branched $C_{1-6}$ alkoxy, straight-chain or branched $C_{1-6}$ alkanol, amino, straight-chain or branched $C_{1-6}$ alkylamino, straight-chain or branched $C_{1-6}$ dialkylamino, or aliphatic or aromatic substituted sulfoxide or sulfone

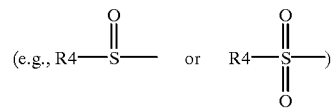

m is 0 to 3;

n is 0 to 4;

p is 1 to 6;

q is 1 or 2; and s is 2 to 10.

Of these, 2-hydroxyphenylbenzotriazole compounds having formula (II) are preferred:

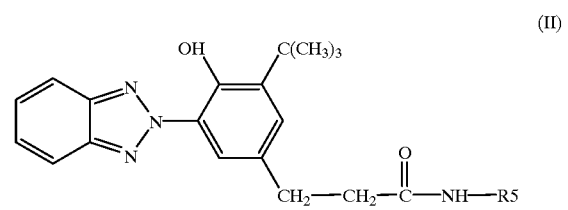

wherein R5 is straight-chain or branched $C_8$ alkyl.

Another useful class of ultraviolet light absorbing compounds is the 2-hydroxybenzophenones. So long as they contain at least one amide group, any of the 2-hydroxybenzophenone ultraviolet light absorbing compounds may be used. Examples of 2-hydroxybenzophenone compounds that may be used in the invention include those of formula (III):

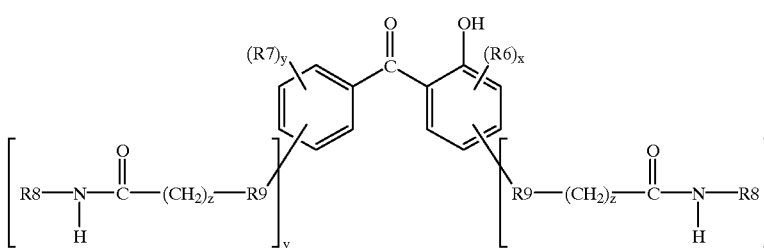

(III)

wherein

- each R9 is independently a covalent bond, —O—, —S—, —CO—, or —NR10—; each R8 is independently straight-chain or branched $C_1$–$C_{18}$ alkyl, straight-chain or branched $C_3$–$C_{18}$ alkyl which is interrupted by O, S or —NR10—, $C_5$–$C_{12}$ cycloalkyl, $C_6$–$C_{14}$ aryl, $C_7$–$C_{15}$ aralkyl, straight-chain or branched $C_3$–$C_8$ alkenyl, or $C_1$–$C_3$ hydroxyalkyl; R10 is H, straight-chain or branched $C_1$–$C_{18}$ alkyl, $C_6$–$C_{12}$ cycloalkyl, straight-chain or branched $C_3$–$C_8$ alkenyl, $C_6$–$C_{14}$ aryl or $C_7$–$C_{18}$ aralkyl;

- each R6 is independently halogen, hydroxy, straight-chain or branched $C_{1-18}$ alkyl, straight-chain or branched $C_{1-18}$ alkoxy, straight-chain or branched $C_{1-18}$ alkanol, amino, straight-chain or branched $C_{1-6}$ alkylamino, or straight-chain or branched $C_{1-6}$ dialkylamino;

- each R7 is independently halogen, hydroxy, straight-chain or ranched $C_{1-18}$ alkyl, straight-chain or branched $C_{1-8}$ alkoxy, straight-chain or branched $C_{1-8}$ alkanol, amino, straight-chain or branched $C_{1-6}$ alkylamino, or straight-chain or branched $C_{1-6}$ dialkylamino;

- u and v are independently 0 or 1, provided that u+v=at least 1;

- x is 0 to 4;

- y is 0 to 5; and

- each z is independently 0 to 6.

2-hydroxybenzophenone compounds of formula (III) may be prepared by methods known in the art, such as by the reaction of an acid of formula

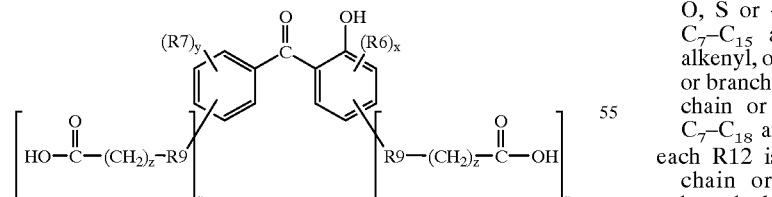

with the corresponding amine.

Examples of particular 2-hydroxybenzophenone compounds useful in the invention include compounds of formulas (IV) or (V):

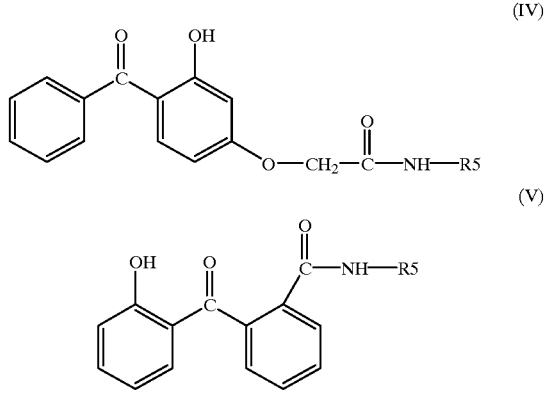

wherein R5 is a straight-chain or branched $C_8$ alkyl group.

Diphenylcyanoacrylamide or diphenylcyanoacrylate ultraviolet light absorbing compounds may also be used, so long as they contain at least one amide group. Examples of useful diphenylcyanoacrylamide compounds include those of formula (VI):

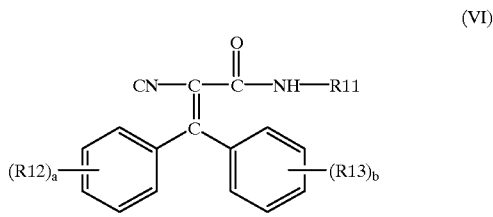

wherein

R11 is straight-chain or branched $C_1$–$C_{18}$ alkyl, straight-chain or branched $C_3$–$C_{18}$ alkyl which is interrupted by O, S or —NR4—, $C_5$–$C_{12}$ cycloalkyl, $C_6$–$C_{14}$ aryl, $C_7$–$C_{15}$ aralkyl, straight-chain or branched $C_3$–$C_8$ alkenyl, or $C_1$–$C_3$ hydroxyalkyl; R4 is H, straight-chain or branched $C_1$–$C_{18}$ alkyl, $C_6$–$C_{12}$ cycloalkyl, straight-chain or branched $C_3$–$C_8$ alkenyl, $C_6$–$C_{14}$ aryl or $C_7$–$C_{18}$ aralkyl;

each R12 is independently halogen, hydroxy, straight-chain or branched $C_{1-6}$ alkyl, straight-chain or branched $C_{1-6}$ alkoxy, straight-chain or branched $C_{1-6}$ alkanol, amino, straight-chain or branched $C_{1-6}$ alkylamino, or straight-chain or branched $C_{1-6}$ dialkylamino;

each R13 is independently halogen, hydroxy, straight-chain or branched $C_{1-6}$ alkyl, straight-chain or branched $C_{1-6}$ alkoxy, straight-chain or branched $C_{1-6}$ alkanol, amino, straight-chain or branched $C_{1-6}$ alkylamino, or straight-chain or branched $C_{1-6}$ dialkylamino;

a is 0 to 5; and b is 0 to 5.

Dimers of any of these ultraviolet light absorbing compounds can be used as well.

Other ultraviolet light absorbing compounds may also be used, provided they contain at least one amide group. Examples of such compounds include p-hydroxybenzoates, triazines and diphenylcyanoacrylates. One or more amide functional ultraviolet light absorbing compounds may be used alone or in combination in the materials and films of the invention.

The amide functional ultraviolet light absorbing compound is combined with a polyurethane polymer to produce the ultraviolet light absorbing material of the invention. The polymer contains at least one monomer having a

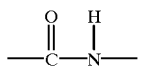

group. At least one such hydrogen bonding site should be present per molecule of amide functional ultraviolet light absorbing compound to allow for adequate formation of hydrogen bonds between the polyurethane polymer and the amide functional ultraviolet light absorbing compound.

The polyurethane polymer is prepared using polymerization methods known in the art. Detailed information on polymer preparation may be found, for example, in the *Encyclopedia of Polymer Science and Engineering*, Vol. 6, Wiley & Sons 1986.

Many polyurethane polymers may be used in this invention. Illustrative examples include those prepared from diisocyanates, diol chain extenders, and polyols, e.g., $H_{12}MDI$ available from Bayer Corp. as DESMODURT™ W, butane diol chain extender, and polycaprolactone having a weight average molecular weight of about 2000 terminated with hydroxyl groups. The diisocyanate and butane diol are considered to form "hard segments" with the polycaprolactone as the "soft segments". Typically the hard segment may comprise about 45 weight percent of the total. The use of other diisocyanates is well known but aliphatic diisocyanates are typically preferred because they offer better resistance to yellowing than do aromatic diisocyanates. A wide range of diols and polyols known to those skilled in the art may be used to prepare suitable polyurethanes.

For some applications, it will be preferred to use aliphatic thermoplastic melt-extrudable polyurethanes.

In addition to the polyurethane polymer and the amide functional ultraviolet light absorbing compound, other components may be present in the ultraviolet light absorbing material of the invention. Examples of such additives include waxes, lubricants, antioxidants, preservatives, plasticizers, dyes, pigments, hindered amine light stabilizers (HALS), other stabilizers, and the like. The exact type and amount of additive used will vary according to the type of UVA and polymer used and their relative proportions, the intended final use of the material, and other factors known to those of skill in the art.

The ultraviolet light absorbing material of the invention is prepared by combining the polyurethane polymer with the amide functional ultraviolet light absorbing compound. A sufficient amount of the UVA is present to provide good ultraviolet light absorbance without blooming or leaching out of the material. In general, about 0.05 to 35 wt-%, preferably about 0.05 to 5 wt-%, and most preferably about 0.25 to 2.5 wt-% of the amide functional ultraviolet light absorbing compound is present in the material, based on the total material weight.

The ultraviolet light absorbing material may be prepared by combining the amide functional ultraviolet light absorbing compound and the polyurethane polymer so that hydrogen bonding takes place between them. This may be accomplished by a number of different methods, including melt blending. The polymer and the UVA may also be compounded in an extruder. The presence of hydrogen bonds between the polyurethane polymer and the amide functional ultraviolet light absorbing compound may be verified by using analytical methods known in the art, such as by a shift in the IR spectrum of the material. See, for example, March, *Advanced Organic Chemistry*, pp.71–3 3d Ed., John Wiley and Sons (1985) and Symons, Chem. Soc. Rev. 12, pp.1–34 (1983).

The material thus formed may be used directly by forming into a film, or may be blended into other polymers which are then formed into films stabilized against the effects of ultraviolet light.

Polymeric Film

The polymeric film of the invention is made up of the ultraviolet light absorbing material of the invention in combination with a polymeric matrix. The ultraviolet light absorbing material preferably resists blooming and/or migration out of the polymeric matrix, thereby increasing the useful life of articles that are protected by the film, which is used as a top layer.

As described above, the ultraviolet light absorbing material is compatible with the polymeric matrix. Any suitable polymeric matrix can be used in accordance with the invention, dependent in part upon the final application or product which is desired. Illustrative examples of polymeric matrices in which ultraviolet light absorbing materials may be incorporated in accordance with the invention include polyamides, polyacrylates, polycarbonates, polyesters, polyurethanes and polyureas (the same or different than the polyurethane(s) or polyurea(s) to which the ultraviolet light absorbing compound is hydrogen bonded), poly(styrene co-acrylonitriles), polyvinyls, olefin copolymers, and the like.

The polymeric film is prepared by combining the ultraviolet light absorbing material of the invention with a polymeric matrix. The ultraviolet light absorbing material is generally present in an amount high enough to provide the resultant polymeric matrix with the ability to absorb ultraviolet light but not so high that the material migrates, separates, or blooms out of the matrix. Typically the polymeric film contains about 0.05 to 35 wt-%, preferably about 0.25 to 8 wt-% of the ultraviolet light absorbing compound, based on the total weight of the film.

The polymeric film may be prepared by blending a melt of the matrix polymer with a melt of the ultraviolet light absorbing material with stirring continued until the mixture is uniform. After uniformity is achieved, the mixture may be pressed or formed into a film using methods known in the art. The film may also be prepared by co-extruding the matrix polymer and the ultraviolet light absorbing material directly into the desired film.

Retroreflective Sheetings

The polymeric films of the invention may be used as the top layer or cover film of a multilayered retroreflective sheeting. Retroreflective sheetings are generally known in the art, as seen for example in Bailey et al., U.S. Pat. No. 4,767,659, which is incorporated herein by reference in its entirety. Polymeric films of the invention may be used as cover films or overlays for embedded-lens and encapsulated-lens sheetings (both microsphere-based and cube corner type); protecting underlying layers of retroreflective elements, binder layers, etc. U.S. Pat. No. 5,450,235 (Smith et al.) and U.S. application Ser. No. 08/472,444, filed Jun. 7, 1995, incorporated herein by reference in their entirety, disclose flexible cube corner type retroreflective sheetings in which polymeric films of the invention may be used. The polymeric films provide protection to the lower layers of the sheeting from ultraviolet light, thereby extending the useful life of the sheeting and articles that incorporate the sheeting.

In addition to providing protection from ultraviolet light, when used as the top layer of a retroreflective sheeting, the polymeric film in some instances should additionally be sufficiently extensible to withstand substantial stretching such as the embossing of a license plate, sufficiently soft that it resists localized delamination when stretched to conform to an irregular surface, and should have good impact resistance. Preferably, when used as the top layer of a retroreflective sheeting the polymeric film has an elongation of at least about 100%, good impact resistance, toughness, and transparency.

Retroreflective sheetings that have the polymeric film of the invention as a top layer typically contain multiple layers. One example of a suitable retroreflective sheeting is a sheeting article that may contain a binder layer; a layer of glass microspheres fully or partially embedded in the binder layer; a specularly reflective layer; and an adhesive layer covered by a removable liner. Other layers may be present as desired. Other types of retroreflective elements can be used if desired.

To prepare a retroreflective sheeting using the polymeric film of the invention, the film is laminated to a retroreflecting base material that contains multiple layers as described above.

The retroreflective sheetings prepared using the polymeric film of the invention may be applied to a wide variety of articles, including traffic signs, rollup signs, sheetings used on canvas backings, barriers, and cones, as well as embossed license or information plates. The preparation of embossed information plates is described in U.S. Pat. Nos. 5,085,918 and 5,227,194, both of which are incorporated herein by reference in their entirety.

Conformable Marking Sheets

Polymeric films of the invention may also be used in the preparation of conformable pavement marking sheets. Illustrative examples of such conformable marking sheets are described in Lasch et al., U.S. Pat. No. 5,194,113, which is incorporated herein by reference in its entirety.

When used in the preparation of a conformable marking sheet, the polymeric film should be sufficiently ductile to allow the sheet to conform to the surface of the pavement or other substrate in order to improve the adhesion of the sheet to the substrate. When used as a top layer in a conformable marking sheet, the polymeric film preferably includes a visibility enhancing pigment such as titanium dioxide or lead chromate.

The polymeric film top sheet or layer may be extruded or laminated directly onto the other layers of the conformable sheet, or an adhesive or other layer may be interposed between the top layer and other layers of the sheet.

Polymeric films of the invention may also be used as a marking sheet independent of a conforming layer. If used in this manner, the polymeric film may be laminated to a layer of pressure sensitive or other suitable adhesive to improve adhesion to the pavement or other substrate. A release liner may also be present to provide ease of handling and storage. In addition, particles may be fully or partially embedded in the top surface of the film to improve the retroreflectivity and/or skid resistance properties of the film.

We claim:

1. A polymeric film comprising a polymeric matrix and an ultraviolet light absorbing material, said ultraviolet light absorbing material comprising a polymer selected from the group consisting of a polyurethane and a polyurea; and an amide functional ultraviolet light absorbing compound, wherein the amide functional ultraviolet light absorbing compound is hydrogen—bonded to the polymer and there is at least 1 hydrogen bonding site on the polymer per mole of ultraviolet light absorbing compound.

2. The film of claim 1 wherein the polymeric matrix comprises a polyurethane.

3. The film of claim 1 wherein the polymeric matrix comprises an aliphatic polyurethane.

4. The film of claim 1 wherein the polymeric matrix comprises at least one of a polyamide, polyacrylate, polycarbonate, polyester, polyurethane, polyurea, poly (styrene co-acrylonitrile), and olefin copolymer.

5. The film of claim 1 wherein the amide functional ultraviolet light absorbing compound is present in an amount of about 0.05 to about 8.0 wt-%, based on the total film weight.

6. The film of claim 1 wherein the amide functional ultraviolet light absorbing compound contains a 2-hydroxyphenylbenzotriazole moiety.

7. The film of claim 1 wherein the amide functional ultraviolet light absorbing compound is a compound of formula (I):

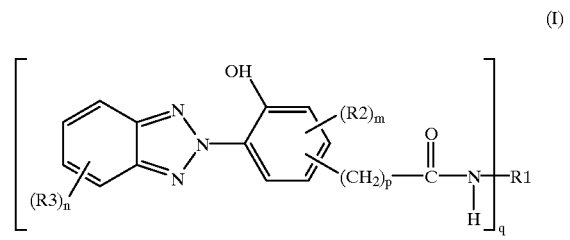

wherein R1 is straight-chain or branched $C_1$–$C_{18}$ alkyl, straight-chain or branched $C_3$–$C_{18}$ alkyl which is interrupted by O, S or —NR4—, $C_5$–$C_{12}$ cycloalkyl, $C_6$–$C_{14}$ aryl, $C_7$–$C_{15}$ aralkyl, straight-chain or branched $C_3$–$C_8$ alkenyl, $C_1$–$C_3$ hydroxyalkyl or

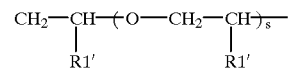

wherein

R1' is H or straight-chain or branched $C_{1-6}$ alkyl; R4 is H, straight-chain or branched $C_1$–$C_{18}$ alkyl, $C_6$–$C_{12}$ cycloalkyl, straight-chain or branched $C_3$–$C_8$ alkenyl, $C_6$–$C_{14}$ aryl or $C_7$–$C_{18}$ aralkyl;

each R2 is independently halogen, hydroxy, straight-chain or branched $C_{1-6}$ alkyl, straight-chain or branched $C_{1-6}$ alkoxy, straight-chain or branched $C_{1-6}$ alkanol, amino, straight-chain or branched $C_{1-6}$ alkylamino, or straight-chain or branched $C_{1-6}$ dialkylamino;

each R3 is independently halogen, hydroxy, straight-chain or branched $C_{1-6}$ alkyl, straight-chain or branched $C_{1-6}$ alkoxy,, straight-chain or branched $C_{1-6}$ alkanol, amino, straight-chain or branched $C_{1-6}$ alkylamino, straight-chain or branched $C_{1-6}$ dialkylamino, or aliphatic or aromatic substituted sulfoxide or sulfone;

m is 0 to 3;

n is 0 to 4;

p is 1 to 6;

q is 1 or 2; and s is 2 to 10.

8. The film of claim 1 wherein the amide functional ultraviolet light absorbing compound is a compound of formula (II):

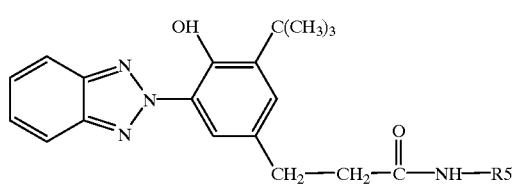

(II)

wherein R5 is a straight-chain or branched $C_8$ alkyl group.

9. The film of claim 8 wherein R5 is n-octyl or 2-ethylhexyl.

10. The film of claim 1 wherein the amide functional ultraviolet light absorbing compound contains a 2-hydroxybenzophenone moiety.

11. The film of claim 1 wherein the amide functional ultraviolet light absorbing compound is a compound of formula (VI):

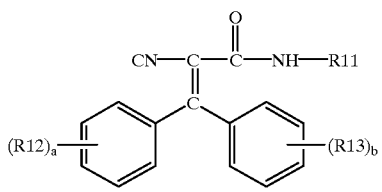

(VI)

wherein

R11 is straight-chain or branched $C_1$–$C_{18}$ alkyl, straight-chain or branched $C_3$–$C_{18}$ alkyl which is interrupted by O, S or —NR4—, $C_5$–$C_{12}$ cycloalkyl, $C_6$–$C_{14}$ aryl, $C_7$–$C_{15}$ aralkyl, straight-chain or branched $C_3$–$C_8$ alkenyl, or $C_1$–$C_3$ hydroxyalkyl; R4 is H, straight-chain or branched $C_1$–$C_{18}$ alkyl, $C_6$–$C_{12}$ cycloalkyl, straight-chain or branched $C_3$–$C_8$ alkenyl, $C_6$–$C_{14}$ aryl or $C_7$–$C_{18}$ aralkyl;

each R12 is independently halogen, hydroxy, straight-chain or branched $C_{1-6}$ alkyl, straight-chain or branched $C_{1-6}$ alkoxy, straight-chain or branched $C_{1-6}$ alkanol, amino, straight-chain or branched $C_{1-6}$ alkylamino, or straight-chain or branched $C_{1-6}$ dialkylamino;

each R13 is independently halogen, hydroxy, straight-chain or branched $C_{1-6}$ alkyl, straight-chain or branched $C_{1-6}$ alkoxy, straight-chain or branched $C_{1-6}$ alkanol, amino, straight-chain or branched $C_{1-6}$ alkylamino, or straight-chain or branched $C_{1-6}$ dialkylamino;

a is 0 to 5; and b is 0 to 5.

12. A method of protecting a substrate from the effects of ultraviolet light, the method comprising applying a polymeric film to the substrate, said film comprising a polymeric matrix and an ultraviolet light absorbing material, said ultraviolet light absorbing material comprising a polymer selected from the group consisting of a polyurethane and a polyurea; and an amide functional ultraviolet light absorbing compound, wherein the ultraviolet light absorbing compound is hydrogen bonded to the polyurethane or polyurea and there is at least one hydrogen bonding site on the polymer per mole of ultraviolet light absorbing compound.

13. The method of claim 12 wherein the polymeric matrix comprises a polyurethane polymer.

14. The method of claim 13 wherein the polymeric matrix comprises an aliphatic polyurethane polymer.

15. The method of claim 12 wherein the amide functional ultraviolet light absorbing compound contains a 2-hydroxyphenylbenzotriazole moiety.

16. The method of claim 12 wherein the amide functional ultraviolet light absorbing compound is a compound of formula (II):

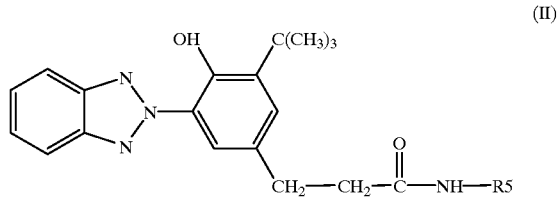

(II)

wherein R5 is a straight-chain or branched $C_8$ alkyl group.

17. The method of claim 12 wherein the amide functional ultraviolet light absorbing compound contains a 2-hydroxybenzophenone moiety.

18. The method of claim 12 wherein the amide functional ultraviolet light absorbing compound is a compound of formula (VI):

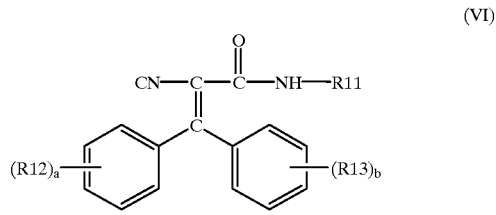

(VI)

wherein

R11 is straight-chain or branched $C_1$–$C_{18}$ alkyl, straight-chain or branched $C_3$–$C_{18}$ alkyl which is interrupted by O, S or —NR4—, $C_5$–$C_{12}$ cycloalkyl, $C_6$–$C_{14}$ aryl, $C_7$–$C_{15}$ aralkyl, straight-chain or branched $C_3$–$C_8$ alkenyl, or $C_1$–$C_3$ hydroxyalkyl; R4 is H, straight-chain or branched $C_1$–$C_{18}$ alkyl, $C_6$–$C_{12}$ cycloalkyl, straight-chain or branched $C_3$–$C_8$ alkenyl, $C_6$–$C_{14}$ aryl or $C_7$–$C_{18}$ aralkyl;

each R12 is independently halogen, hydroxy, straight-chain or branched $C_{1-6}$ alkyl, straight-chain or branched $C_{1-6}$ alkoxy, straight-chain or branched $C_{1-6}$ alkanol, amino, straight-chain or branched $C_{1-6}$ alkylamino, or straight-chain or branched $C_{1-6}$ dialkylamino;

each R13 is independently halogen, hydroxy, straight-chain or branched $C_{1-6}$ alkyl, straight-chain or branched $C_{1-6}$ alkoxy, straight-chain or branched $C_{1-6}$ alkanol, amino, straight-chain or branched $C_{1-6}$ alkylamino, or straight-chain or branched $C_{1-6}$ dialkylamino;

a is 0 to 5; and b is 0 to 5.

19. The method of claim 12 wherein the amide functional ultraviolet light absorbing compound contains a diphenylcyanoacrylamide or diphenylcyanoacrylate group.

20. The film of claim 4 wherein the ultraviolet light absorbing material is compatible with the polymeric matrix such that the ultraviolet light absorbing material is miscible in said polymeric matrix.

21. The film of claim 4 wherein the ultraviolet light absorbing material is compatible with the polymeric matrix such that the ultraviolet light absorbing material is blended in said polymeric matrix.

* * * * *

UNITED STATES PATENT AND TRADEMARK OFFICE
CERTIFICATE OF CORRECTION

PATENT NO. : 6,291,586 B1
DATED : September 18, 2001
INVENTOR(S) : Lasch, James E.

It is certified that error appears in the above-identified patent and that said Letters Patent is hereby corrected as shown below:

<u>Title page,</u>
Item [56], References Cited, U.S. PATENT DOCUMENTS, please add:

| | | | |
|---|---|---|---|
| -- 3,272,891 | 9/13/66 | Milionis et al. | 260/895 |
| 4,027,081 | 5/31/77 | Turner | 526/15 |
| 4,767,659 | 8/30/88 | Bailey et al. | 428/203 |
| 4,778,728 | 10/18/88 | Lucas | 428/461 |
| 4,785,063 | 11/15/88 | Slongo et al. | 526/259 |
| 4,868,246 | 9/19/89 | MacLeay et al. | 525/142 |
| 4,892,915 | 1/9/90 | Slongo et al. | 526/259 |
| 4,996,326 | 2/26/91 | Leppard et al. | 548/261 |
| 5,021,478 | 6/4/91 | Ravichandran et al. | 524/91 |
| 5,085,918 | 2/4/92 | Rajan et al. | 428/195 |
| 5,096,781 | 3/17/92 | Vieira et al. | 428/411.1 |
| 5,096,948 | 3/17/92 | Kurumada et al. | 524/91 |
| 5,096,949 | 3/17/92 | Lai et al. | 524/91 |
| 5,194,113 | 3/16/93 | Lasch et al. | 156/243 |
| 5,227,194 | 7/13/93 | DeLaSierre E. | 427/162 -- |

FOREIGN PATENT DOCUMENTS, please add:

-- 0 315 155    5/89    EPO --

OTHER DOCUMENTS, please add:

-- ASTM E 810 - Standard Test Method for Coefficient of Retroreflection of Retroreflective Sheeting ASTM G 23 Type E - Standard Practice for Operating Light-Exposure Apparatus (Carbon-Arc Type) With and Without Water for Exposure of Nonmetallic Materials <u>Advanced Organic Chemistry</u>, 3d Ed., John Wiley & Sons, March 1985, pp. 71-73.

<u>Encyclopedia of Polymer Science and Engineering</u>, Vol. 6, Wiley & Sons, 1986, pp. 404-408 and 420-424.

UNITED STATES PATENT AND TRADEMARK OFFICE
CERTIFICATE OF CORRECTION

PATENT NO. : 6,291,586 B1
DATED : September 18, 2001
INVENTOR(S) : Lasch, James E.

It is certified that error appears in the above-identified patent and that said Letters Patent is hereby corrected as shown below:

Chem Soc. Rev., "Structure in Solvents and Solutions -- NMR and Vibrational Spectroscopic Studies," Vol. 12, 1983, pp. 1-34.

Databases "Chemical Abstracts, Registry," Abs. 101:231 645 and R.N.'s 24991-11-5, 29467-65-0, Columbus OH and JP A 59 130 505 27 Jul 1984 --

Column 5,
Line 36, delete "ranched" and insert in place thereof -- branched --.
Line 36, delete "$C_{1-8}$" and insert in place thereof -- $C_{1-18}$ --.
Line 37, delete "$C_{1-8}$" and insert in place thereof -- $C_{1-18}$ --.

Column 10,
Line 55, delete ",", second occurrence.

Signed and Sealed this

Twenty-fourth Day of September, 2002

*Attest:*

*Attesting Officer*

JAMES E. ROGAN
*Director of the United States Patent and Trademark Office*